(12) United States Patent
Mandle

(10) Patent No.: US 8,695,412 B2
(45) Date of Patent: Apr. 15, 2014

(54) PROBE FOR MEASURING A LOCAL ANGLE OF ATTACK AND METHOD IMPLEMENTING SAME

(71) Applicant: Thales, Neuilly-sur-Seine (FR)

(72) Inventor: Jacques Mandle, Saint Peray (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 13/711,572

(22) Filed: Dec. 11, 2012

(65) Prior Publication Data

US 2013/0145836 A1 Jun. 13, 2013

(30) Foreign Application Priority Data

Dec. 12, 2011 (FR) ..................................... 11 03808

(51) Int. Cl.
*G01M 9/00* (2006.01)
(52) U.S. Cl.
USPC ............................................................ 73/147
(58) Field of Classification Search
None
See application file for complete search history.

(56) References Cited

U.S. PATENT DOCUMENTS

| | | | | |
|---|---|---|---|---|
| 4,718,273 A * | 1/1988 | McCormack | ................... | 73/180 |
| 5,025,661 A * | 6/1991 | McCormack | ................... | 73/180 |
| 6,273,370 B1 * | 8/2001 | Colgren | ......................... | 244/181 |
| 6,453,298 B2 * | 9/2002 | Murakami et al. | ............ | 705/7.25 |
| 6,526,821 B1 * | 3/2003 | Corda et al. | .................... | 73/186 |
| 6,557,423 B1 | 5/2003 | Vozhdaev | | |
| 7,334,467 B1 * | 2/2008 | DuPuis | ...................... | 73/170.02 |
| 7,377,159 B2 * | 5/2008 | Thomas | ...................... | 73/170.02 |
| 7,379,839 B2 * | 5/2008 | Cronin et al. | ................. | 702/138 |

FOREIGN PATENT DOCUMENTS

| | | |
|---|---|---|
| EP | 1020717 A1 | 7/2000 |
| WO | 93/03326 A1 | 2/1993 |

* cited by examiner

*Primary Examiner* — Lisa Caputo
*Assistant Examiner* — Jermaine Jenkins
(74) *Attorney, Agent, or Firm* — Baker Hostetler LLP

(57) ABSTRACT

A probe for measuring a local angle of attack designed to be fixed to a wall and a method implementing the probe are provided. The probe comprises at least three pressure sampling ports disposed over a nose of the probe body, pressure measurement means associated with the pressure sampling ports and calculation means capable of determining an angle of attack of the flow with respect to the main direction of the probe body as a function of the pressures measured by the pressure measurement means. The calculation means are configured for choosing from amongst the pressure sampling ports those allowing the best measurement precision of the local angle of attack to be obtained and for calculating the local angle of attack with respect to the main direction using the pressure measurements carried out in the chosen pressure sampling ports.

14 Claims, 4 Drawing Sheets

PROBE FOR MEASURING A LOCAL ANGLE OF ATTACK AND METHOD IMPLEMENTING SAME

CROSS-REFERENCE TO RELATED APPLICATION

This application claims priority to foreign French patent application No. FR 1103808, filed on Dec. 12, 2011, the disclosure of which is incorporated by reference in its entirety.

FIELD OF THE INVENTION

The invention relates to a probe for measuring a local angle of attack and a method implementing the probe.

BACKGROUND

The invention is particularly applicable in the field of aeronautics where knowledge of the angle of attack of a flow of air surrounding an aircraft is essential to the piloting of the aircraft. The angle of attack with respect to a horizontal plane of the aircraft is an important parameter for determining the lift of the aircraft and particularly when close to stalling. The angle of attack with respect to a vertical plane of the aircraft is also important; this corresponds to the yaw of the aircraft. In order to determine these two parameters—angle of attack and yaw—the orientation of the airflow on the skin of the aircraft can be measured locally. These are local measurements of angles of attack that are carried out at particular points of the aircraft.

Three large families of aerodynamic probes have been developed for measuring the local angle of attack on the aircraft.

A first family of probe uses a mobile appendage protruding from the skin of the aircraft. This mobile appendage can take the form of a flag oriented along the axis of the airflow. The orientation of the flag then gives the local angle of attack of the airflow. These mobile probes must comprise systems for rotation between fixed and mobile parts with minimum friction.

A second family of probe uses an appendage having two orifices activating a pneumatic motor closed-loop controlling the said appendage in such a manner that the two pressures remain equal.

A third family of probe uses a fixed appendage protruding from the skin of the aircraft. The determination of the local angle of attack may be effected based on a differential measurement between two pressure sampling ports disposed on the nose of the fixed appendage, one situated on the leading edge of the appendage and the other on the trailing edge. The leading edge and the trailing edge are defined with respect to a region of the appendage where the airflow forms a null point with a zero angle of attack. This method for determining the local angle of attack has several drawbacks. In order to obtain a high enough precision, notably during certain phases of flight, the gain of the measurement chain must be high enough and saturation of the latter is quickly reached. Moreover, for high angles of attack, the airflow detaches from the appendage, thus causing errors in the measurement of a local angle of attack.

Other principles have been proposed: measurement by LIDAR or completely mechanical systems.

SUMMARY OF THE INVENTION

The invention aims to overcome all or a part of the aforementioned problems by providing a probe for measurement of the local angle of attack with a fixed appendage and a method implementing the probe. The invention allows precise measurements of the angle of attack to be obtained over a very wide measurement range.

For this purpose, one subject of the invention is a probe for measurement of the local angle of attack of a fluid flow along a wall, the probe comprising a probe body designed to be fixed to the wall and aligned in a main direction, around which the angle of attack can be measured within a range of angle of attack, at least five pressure sampling ports disposed over a nose of the probe body, the nose being situated on one side of the body with respect to the largest cross section of the body perpendicularly to the main direction, the nose forming a surface locally perpendicular to the angle of attack inside of the range, pressure measurement means associated with the pressure sampling ports and calculation means capable of determining an angle of attack of the flow with respect to the main direction of the probe body as a function of the pressures measured by the pressure measurement means, wherein the calculation means are configured for choosing from amongst the pressure sampling ports those allowing the best measurement precision of the local angle of attack to be obtained and for calculating the local angle of attack with respect to the main direction using the pressure measurements carried out in the chosen pressure sampling ports.

Another subject of the invention is a method for measuring the local angle of attack of a fluid flow along a wall by means of a probe comprising a boom designed to be fixed to the wall, a probe body fixed to the boom and aligned in a main direction, at least three pressure sampling ports disposed over a nose of the probe body, pressure measurement means associated with the pressure sampling ports and calculation means capable of determining an angle of attack of the flow with respect to the main direction of the probe body, consisting in:

choosing from amongst the pressure sampling ports those allowing the best measurement precision of the angle of attack to be obtained, then, calculating the angle of attack with respect to the main direction using the pressure measurements carried out in the chosen pressure sampling ports.

By choosing from amongst the pressure sampling ports those that allow the best measurement precision of the local angle of attack to be obtained allows the extent of measurement of the angle of attack to be increased and thus greater local angles of attack to be measured. More precisely, at high angles of attack, some pressure sampling ports may be situated in a part of the probe body where the airflow is detached. These pressure sampling ports will not be chosen for calculating the local angle of attack.

BRIEF DESCRIPTION OF THE DRAWINGS

The invention will be better understood and other advantages will become apparent upon reading the detailed description of one embodiment presented by way of example, which description is illustrated by the appended drawing in which.

For the sake of clarity, the same elements will carry the same labels in the various figures.

DETAILED DESCRIPTION

Figure 1:
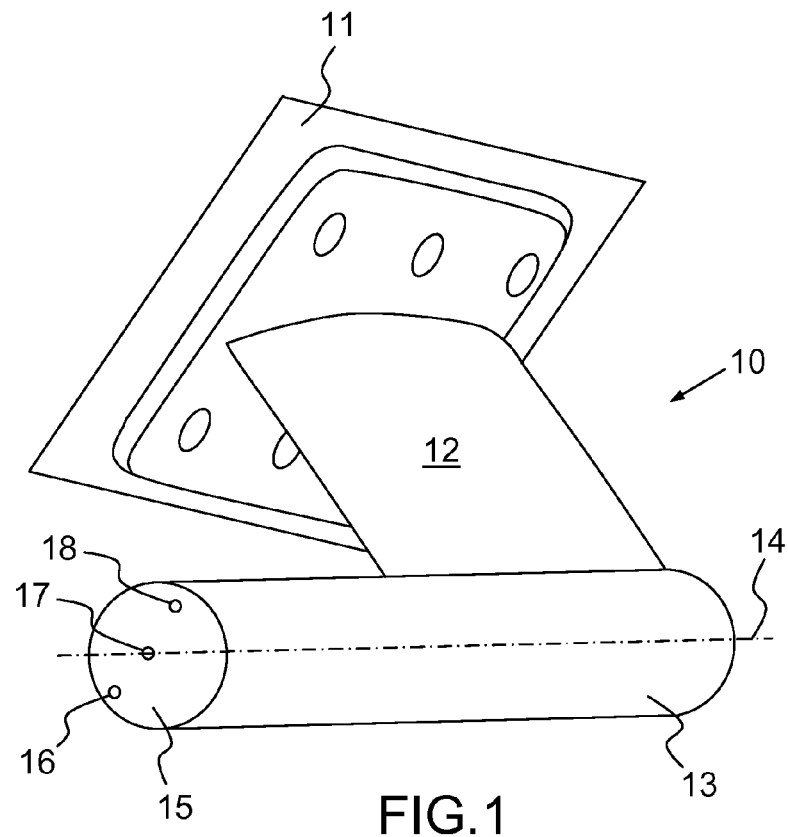
FIG. 1 shows a probe for local angle of attack according to the invention mounted on the skin of an aircraft.

FIG. 1 shows a probe 10 for measuring a local angle of attack mounted on the skin 11 of an aircraft. The probe 10 allows the angle of attack of the air flowing along the skin 11 to be measured. Such a probe may be positioned at 3 o'clock or at 9 o'clock on the skin of the nose of the aircraft in order to determine the angle of attack of the aircraft. It may also be positioned at 6 o'clock or at 12 o'clock in order to determine the yaw of the aircraft.

The probe 10 comprises a boom 12 and a probe body 13 fixed to the boom 12. The boom 12 allows the probe body 13 to be positioned outside of a limited layer created in the flow of the air in the immediate vicinity of the skin 11. The boom 12 has, for example, the shape of an aeroplane wing in order to limit the drag in the airflow. The boom 12 is fixed to the skin 11 for example by means of screws. The probe body 13 is for example of cylindrical shape. The probe body 13 is aligned in a main direction 14 which, in the example of the cylindrical shape, is the axis of the shape. When the probe 10 is installed on the skin of the aircraft, it is advantageous to align the main direction 14 with the direction of the air along the skin 11 when the aircraft is in horizontal flight.

The probe 10 does not comprise any mobile mechanism designed to align itself in the axis of the flow of the air. The probe 10 belongs to the family of fixed probes.

The probe body 13 has one end 15 referred to as nose which is at least partly facing the airflow when the latter follows the direction 14. In other words, the nose 15 has a non-zero inclination with respect to the direction 14, in contrast to a rear cylindrical part of the probe body 13. The probe 10 comprises at least three pressure sampling ports 16, 17 and 18 disposed on the nose 15 of the probe body 13.

Figure 2:
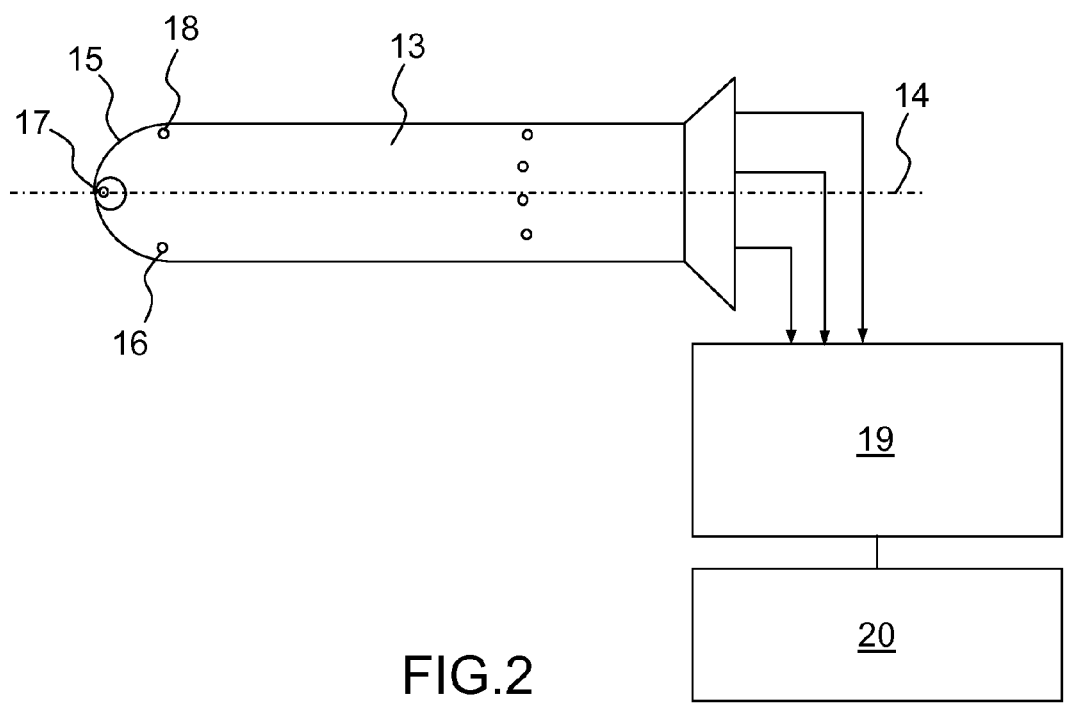
FIG. 2 shows schematically various functional elements of the probe used for determining the local angle of attack.

FIG. 2 shows schematically the probe 10 which comprises other components that can be situated inside of the skin 11 of the aircraft, such as notably pressure measurement means 19 associated with the pressure sampling ports 16, 17 and 18 and calculation means 20 capable of determining the angle of attack of the airflow with respect to the direction 14. The pressure sampling ports 16, 17 and 18 are connected to the pressure measurement means 19 via pneumatic channels situated in the probe body 13 and in the boom 12. The pressure measurement means 19 may for example be pressure sensors. The pressure of each pressure sampling port 16, 17 and 18 may be compared with a reference pressure. The pressures of the various pressure sampling ports may also be compared with one another. The advantage of differential pressure sensors will be seen later on. As an alternative, flow meters may also be implemented in place of the pressure sensors.

According to the invention, the calculation means 20 are configured for choosing from amongst the pressure sampling ports 16, 17 and 18 those allowing the best measurement precision of the local angle of attack to be obtained and for calculating the local angle of attack with respect to the main direction 14 using the pressure measurements carried out in the chosen pressure sampling ports.

Figure 3:
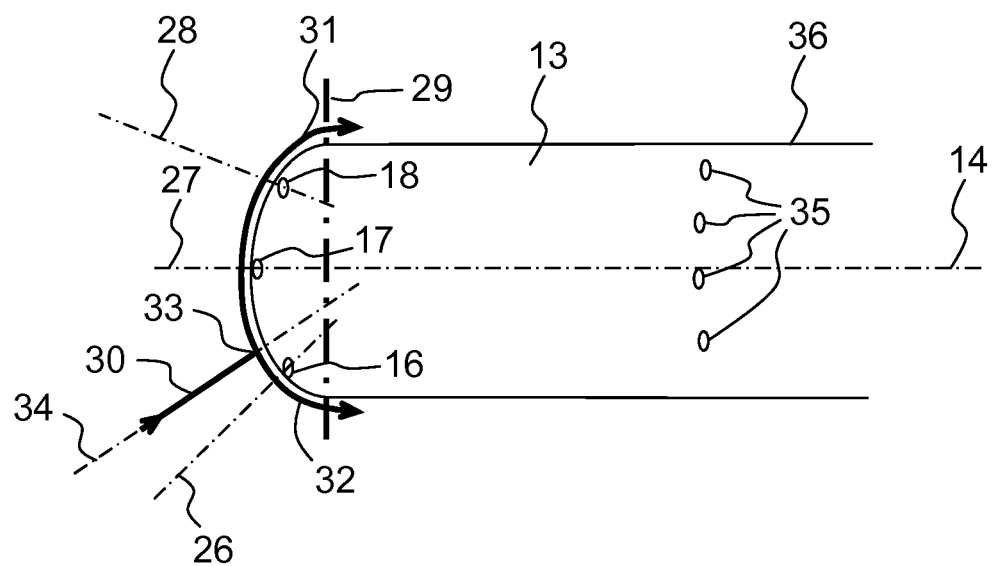
FIGS. 3 and 4 show two variants for the body of the probe.

FIG. 3 shows an advantageous shape of the probe body 13. The nose 15 of the probe body 13 has a rounded shape. Each of the pressure sampling ports 16, 17 and 18 is disposed at a position where a direction normal to the probe body 13, respectively 26, 27 and 28, is defined. It is possible to place the pressure sampling port 17 such that its normal direction 27 coincides with the direction 14. The pressure sampling ports 16, 17 and 18 are distributed over the nose 15 with a rounded shape in such a manner that the normal directions 26, 27 and 28 have different angles in a plane in which the angle of incidence is measured. Here, this plane is the plane in FIG. 3. This plane is disposed so as to be parallel to the wall 11 along which it is desired to find out the local angle of attack of the airflow. It is possible to define the nose of the probe body as being situated on one side of the body with respect to the largest cross section 29 of the body perpendicularly to the main direction 14. In this embodiment, the cross section 29 is a section of the surface 36 parallel to the direction 14. The measurement of the angle of attack can be made inside of a range of angle of attack distributed around the main direction 14. The nose forms a surface locally perpendicular to the angle of attack inside of the range of measurement. The range of measurement can extend on either side of the direction 14 up to the cross section 29. In other words, the range of measurement is + or −90° about the direction 14. Advantageously, the range of measurement is limited by the directions perpendicular to the surface of the nose at the two end pressure sampling ports 26 and 28.

A first step of a method implementing the probe 10 consists in choosing from amongst the pressure sampling ports 16, 17 and 18 those allowing the best measurement precision of the angle of attack to be obtained. In FIG. 3, the direction of the flow upstream of the probe body 13 is represented by the arrow 30. When the flow reaches the probe body 13, it separates into two parts 31 and 32. The separation occurs at a null point 33 at which a normal direction 34 to the probe body 13 can be defined. The angle that the direction 34 makes with respect to the direction 14 is the local angle of attack sought.

In order to choose the pressure sampling ports that are best able to define this angle of attack, an approximate position of the null point 33 of the airflow on the probe body 13 can first of all be determined, then the two pressure sampling ports closest to the null point 33 retained.

In order to define this approximate position, from amongst the pressures measured in the three pressure sampling ports 16, 17 and 18, the two pressure sampling ports that have the highest pressures can be sought. Indeed, on a round surface, the further one moves from the null point 33, the lower the pressures. In FIG. 3, the null point 33 is situated between the pressure sampling ports 16 and 17. These two pressure sampling ports will have a pressure greater than that of the pressure sampling port 18. The choice of the pressure sampling ports 16 and 17 is therefore made. This method of selection requires a substantially constant angular distribution of the normal directions 26 to 28 of the various pressure sampling ports 16 to 18.

As an alternative, an approximate local angle of attack may be calculated using the pressure measurements carried out in the pressure sampling ports the furthest from the main direction of the probe body 13; these are the pressure sampling ports 16 and 18 in the example shown. The position of the null point 33 is then defined on the probe body 13 at a point where the approximate direction of the local angle of attack is normal to the probe body 13.

The calculation of the approximate local angle of attack can be carried out based on the difference between the pressures measured at the two pressure sampling ports 16 and 18. This is because the angle of attack varies proportionally to this difference. It has also been observed that the speed of the aircraft had a bearing on the calculation of the angle of attack. More precisely, the angle of attack is proportional to the ratio between the difference between the pressures measured at the two pressure sampling ports 16 and 18 and a difference between the total pressure and the static pressure of the fluid flow.

In other words, the approximate local angle of attack $\alpha_a$ may be expressed in the following manner:

$$\alpha_a = K \frac{P_{18} - P_{16}}{P_T - P_S} \quad (1)$$

with P18 and P16: the pressures respectively measured by the pressure sampling ports 18 and 16, $P_T$, the total pressure and $P_S$ the static pressure of the fluid flow. K is a coefficient depending on the geometry of the probe; it can be determined empirically by wind tunnel testing.

The total pressure $P_T$ and the static pressure $P_S$ can each be determined by a specific probe, distinct from the probe 10. Advantageously, the total pressure $P_T$ and the static pressure $P_S$ are measured by the probe 10 itself. For this purpose, the probe 10 comprises a total pressure sampling port and a static pressure sampling port. The total pressure sampling port can be the pressure sampling port 17 with a normal direction 27 coincident with the direction 14. The total pressure sampling port comprises for example a tube aligned in the main direction 14 of the probe body 13. This tube is commonly known as a Pitot tube. The static pressure sampling port can be composed of several pressure sampling ports 35 disposed on the probe body 13 further back than the pressure sampling ports 16 to 18. The pressure sampling ports 35 are in general disposed on a surface 36 of the probe body 13, which surface is parallel to the direction 14. The various pressure sampling ports are connected together in order to measure an average pressure that is substantially invariant when the angle of attack of the airflow with respect to the probe body 13 is modified.

A second step of the method of the invention consists in calculating the angle of attack a with respect to the main direction 14 using the pressure measurements carried out in the chosen pressure sampling ports, the pressure sampling ports 16 and 17 in the present example. The same type of calculation as previously carried out may be repeated:

$$\alpha_a = K \frac{P_{17} - P_{16}}{P_T - P_S} \quad (2)$$

A much better precision than that obtained using only the pressure sampling ports 16 and 18 the furthest from the main direction 14 is thus obtained.

The use of differential pressure sensors was mentioned hereinabove. These sensors are placed between the various pressure sampling ports of the probe 10 according to the needs of the calculation means 20. In the example shown, sensors yielding the following differences are used: P18–P16, P18–P17, P17–P16 together with $P_T$–$P_S$. Such sensors improve the precision of calculation of the local angle of attack because they avoid the comparison with a reference pressure which may be different from one sensor to another.

Figure 4:
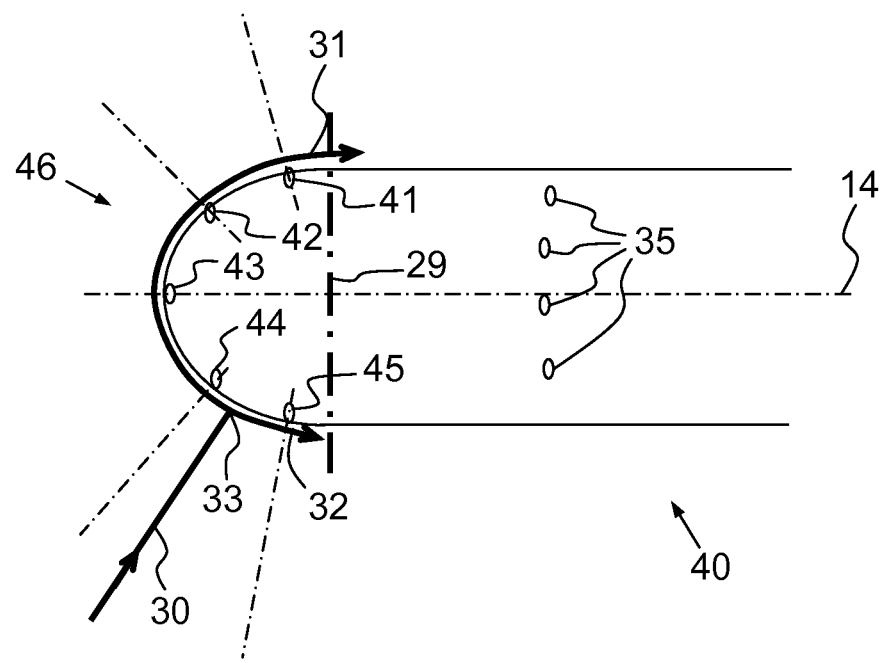

FIG. 4 shows one variant of a probe 40 in which five pressure sampling ports 41, 42, 43, 44 and 45 are disposed over a nose 46 of a probe body 47 being similar to the probe body 13 and fixed onto the boom 12. The five pressure sampling ports 41, 42, 43, 44 and 45 are designed for the determination of the local angle of attack. As previously, the nose 46 of the probe body 47 has a rounded shape so as to dispose the pressure sampling ports 41, 42, 43, 44 and 45 at specific positions where directions normal to the probe body 47 have different angles in a plane in which the angle of attack is measured.

Increasing the number of pressure sampling ports allows either the precision in the calculation of the local angle of attack to be improved by bringing the normal directions of the pressure sampling ports angularly closer, or the measurement amplitude to be increased by allowing greater angles of attack to be reached. In the example shown, the null point 33 is situated between the pressure sampling ports 44 and 45. The choice of the pressure sampling ports is made as explained using the variant in FIG. 3. When the approximate local angle of attack $\alpha_a$ is calculated using the pressure measurements carried out in the pressure sampling ports the furthest from the main direction 14 of the probe body, in this case the pressure sampling ports 41 and 45, it is possible for the pressure sampling port 41 to be in an area detached from the airflow. This does not affect the approximate calculation. Subsequently, the local angle of attack is calculated from the difference between the pressures measured in the two pressure sampling ports 44 and 45 which are not in the detached area.

In the second step of the method, it is possible to measure the total pressure $P_T$ by means of the pressure sampling port 43 whatever the choice made in the first step. The pressure sampling port 43 is disposed on the direction 14. A calibration in a wind tunnel will allow any differences between the effective total pressure of the flow and the pressure measured by means of the pressure sampling port 43 to be corrected. Alternatively, it is possible to use the pressure sampling port closest to the null point 33 as pressure sampling port for measuring the total pressure $P_T$. In the example shown, the pressure sampling port 44 is chosen. This pressure sampling port is not perfectly on the axis of the flow and therefore requires a calibration in a wind tunnel. In this second alternative, a better precision than in the first alternative is however obtained.

These two alternatives can of course be implemented in the probe variant 10 shown in FIG. 3.

Figure 5:
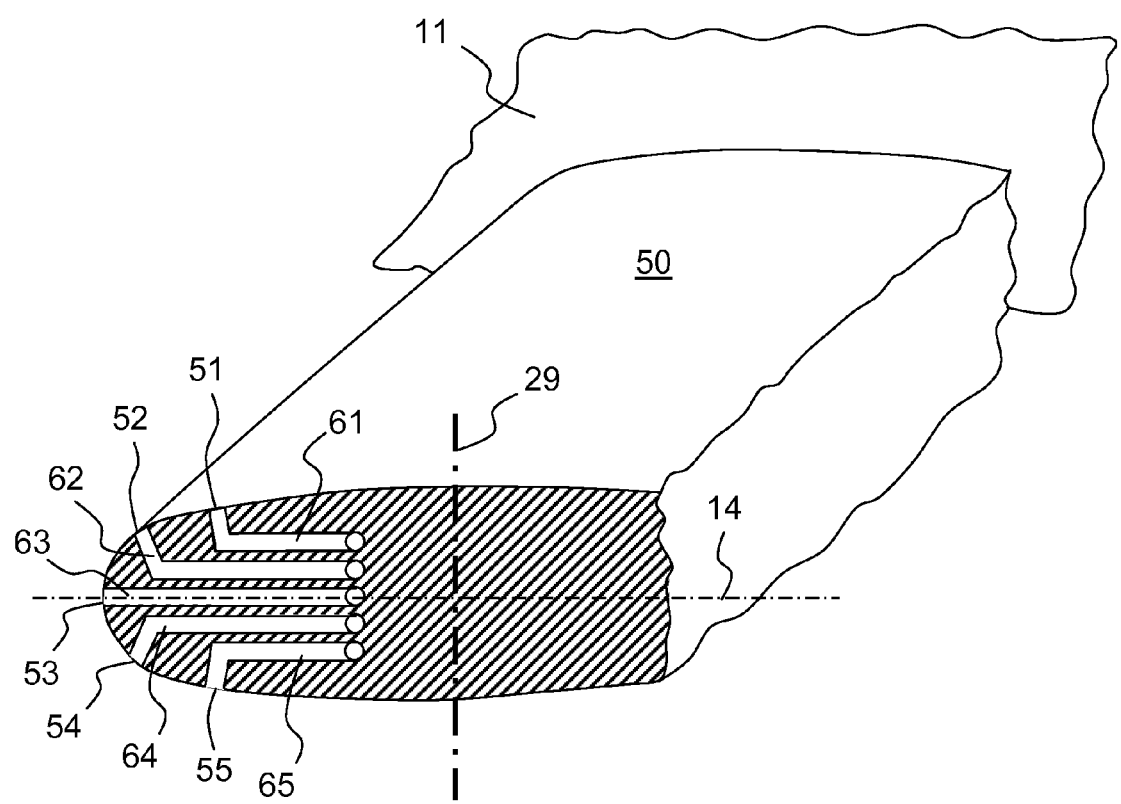
FIGS. 5 and 6 show an aileron implementing the invention.

FIG. 5 shows the implementation of the invention on an aileron for example used for the stabilization of the flight of an aircraft. More generally speaking, the invention can be implemented for any appendage protruding with respect to the fuselage of an aircraft, at which appendage it is desired to know the local angle of attack of the airflow surrounding it. An aircraft is understood to mean any motorized flying device, such as for example an aeroplane, a helicopter or even a missile.

In FIG. 5, an aileron 50 is fixed onto the wall 11. The aileron 50 forms the probe body allowing the local angle of attack of an airflow along the wall 11 to be measured. The aileron 50 comprises five pressure sampling ports 51, 52, 53, 54 and 55 disposed in a plane 56 parallel to the wall at the level of the fixing of the aileron 50. In FIG. 5, the aileron 50 is shown in perspective cross-sectioned by the plane 56. In addition, only the front part of the aileron 50, the part containing the attack edge of the aileron, is shown. The front part forms the nose of the probe body.

Each of the pressure sampling ports 51, 52, 53, 54 and 55 is connected to the pressure measurement means 19 via a pneumatic channel, respectively 61, 62, 63, 64 and 65, situated in the aileron 50.

In FIG. 5, the attack edge of the aileron 50 is rounded. In other words, the surface of the nose does not have any discontinuity, in other words no sharp angles.

Figure 6:
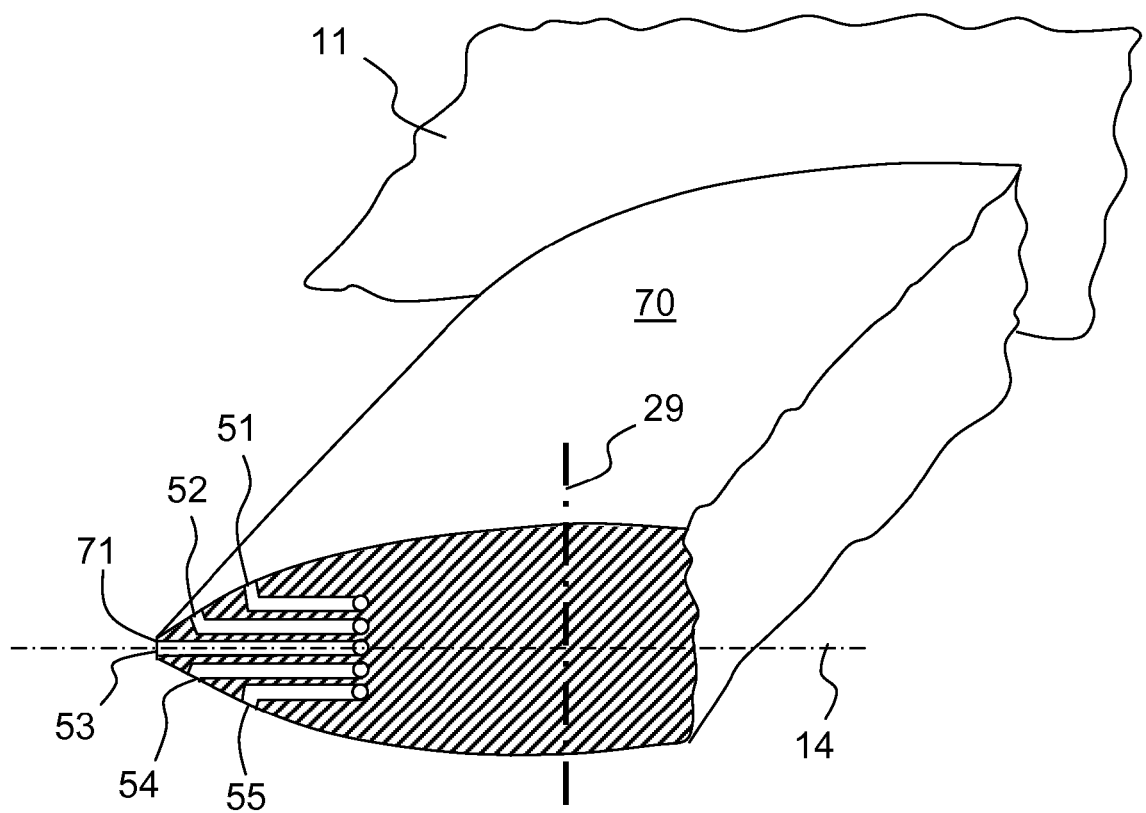

In FIG. 6, another aileron 70 implementing the invention is shown. In contrast to the aileron 50, the attack edge 71 of the aileron 70 has an angular discontinuity at the pressure sampling port 53 situated on the axis 14. In this variant, on either side of the discontinuity, the two pressure sampling ports, 51 and 52, on the one hand, 54 and 55, on the other hand, are disposed on a surface of the aileron not having any discontinuity. In other words, the angle-of-attack probe has at least two pressure sampling ports disposed on a surface of the probe with no discontinuity.

On the ailerons 50 and 70, it is of course possible to use the pressure sampling port 53 as total pressure sampling port. It is also possible to dispose on the surface of the aileron one or more static pressure sampling ports similar to the pressure sampling ports 35.

The invention claimed is:

1. A probe for measurement of the local angle of attack of a fluid flow along a wall, the probe comprising:
a probe body designed to be fixed to the wall and aligned in a main direction, around which the angle of attack can be measured within a range of angle of attack, at least five pressure sampling ports disposed over a nose of the probe body, the nose being situated on one side of the body with respect to the largest cross section of the body perpendicularly to the main direction, the nose forming a surface locally perpendicular to the angle of attack inside of the range, pressure measurement means associated with the pressure sampling ports and calculation means capable of determining an angle of attack of the flow with respect to the main direction of the probe body as a function of the pressures measured by the pressure measurement means, wherein the calculation means are configured for choosing from amongst the pressure sampling ports those allowing the best measurement precision of the local angle of attack and for calculating the local angle of attack with respect to the main direction using the pressure measurements carried out in the chosen pressure sampling ports.

2. The probe according to claim 1, wherein the calculation means are configured for determining the local angle of attack with respect to the main direction using the pressure measurements carried out in the chosen pressure sampling ports proportionally to a difference between the pressures measured at the chosen pressure sampling ports.

3. The probe according to claim 1, wherein the nose of the probe body has a rounded shape so as to dispose the pressure sampling ports over the nose of the probe body at specific positions where directions normal to the probe body have different angles in a plane in which the angle of angle of attack is measured.

4. The probe according to claim 1, formed on an aileron fixed to the wall.

5. The probe according to claim 4, wherein the nose has a discontinuity situated on the main direction.

6. The probe according to claim 5, having at least two pressure sampling ports disposed on a surface of the probe with no discontinuity.

7. The probe according to claim 1, further comprising a total pressure sampling port comprising a tube aligned in the main direction of the probe body.

8. The probe according to claim 1, further comprising a static pressure sampling port.

9. A method for measuring the local angle of attack of a fluid flow along a wall by means of a probe comprising a boom designed to be fixed to the wall, a probe body fixed onto the boom and aligned in a main direction, at least three pressure sampling ports disposed over a nose of the probe body, pressure measurement means associated with the pressure sampling ports and calculation means capable of determining an angle of attack of the flow with respect to the main direction of the probe body, the method comprising:
choosing from amongst the pressure sampling ports those allowing the best measurement precision for the angle of attack to be obtained, and
then, calculating the angle of attack with respect to the main direction using the pressure measurements carried out in the chosen pressure sampling ports.

10. The method according to claim 9, the choice from amongst the pressure sampling ports consisting in:
determining an approximate position of a null point of the airflow on the probe body,
then, selecting the two pressure sampling ports closest to the null point.

11. The method according to claim 10, the determination of the approximate position of a null point consisting in:
calculating an approximate local angle of attack, using the pressure measurements carried out in the pressure sampling ports furthest from the main direction of the probe body;
the position of the null point being defined on the probe body at a point where the approximate direction of the local angle of attack is normal to the probe body.

12. The method according to claim 9, wherein the local angle of attack with respect to the main direction based on the pressure measurements carried out in the chosen pressure sampling ports is proportional to a difference between the pressures measured at the two chosen pressure sampling ports.

13. The method according to claim 12, implementing a probe further comprising a total pressure sampling port and a static pressure sampling port, wherein the value of the local angle of attack is proportional to the ratio between the difference between the pressures measured at the two chosen pressure sampling ports and a difference between the pressures measured at the total pressure sampling port and at the static pressure sampling port.

14. The method according to claim 13, wherein the total pressure sampling port is chosen from amongst the pressure sampling ports disposed over the nose of the probe body as being the closest to the null point.

* * * * *